(12) United States Patent
Gilmour (10) Patent No.: US 11,213,874 B2
(45) Date of Patent: Jan. 4, 2022

(54) LEAD ACID BATTERY CASE PUNCH AND SENSOR

(71) Applicant: Farmer Mold and Machine Works, Inc., St. Petersburg, FL (US)

(72) Inventor: Jim Gilmour, St. Pete Beach, FL (US)

(73) Assignee: Farmer Mold and Machine Works, Inc., St. Petersburg, FL (US)

( * ) Notice: Subject to any disclaimer, the term of this patent is extended or adjusted under 35 U.S.C. 154(b) by 0 days.

(21) Appl. No.: 16/772,017

(22) PCT Filed: Jan. 4, 2019

(86) PCT No.: PCT/US2019/012400
§ 371 (c)(1),
(2) Date: Jun. 11, 2020

(87) PCT Pub. No.: WO2019/136286
PCT Pub. Date: Jul. 11, 2019

(65) Prior Publication Data
US 2020/0376537 A1    Dec. 3, 2020

Related U.S. Application Data

(60) Provisional application No. 62/613,955, filed on Jan. 5, 2018.

(51) Int. Cl.
*B21D 28/24* (2006.01)
*B21D 28/04* (2006.01)
(Continued)

(52) U.S. Cl.
CPC ............. *B21D 28/24* (2013.01); *B21D 28/04* (2013.01); *G01D 5/268* (2013.01); *G02B 6/4202* (2013.01);
(Continued)

(58) Field of Classification Search
CPC ...... B21D 28/04; B21D 28/24; B21D 28/243; B21D 28/26; B21D 28/28; B21D 28/34;
(Continued)

(56) References Cited

U.S. PATENT DOCUMENTS 3,380,160 A * 4/1968 Walter ............... B26F 1/36
30/362
3,552,250 A * 1/1971 Nordvik .............. B26D 5/12
83/162
(Continued)

FOREIGN PATENT DOCUMENTS

GB         1484268 A        9/1977

OTHER PUBLICATIONS

Integral definition and purpose. google.com—Integral definition.*

*Primary Examiner* — Edward T Tolan
*Assistant Examiner* — Smith Oberto Bapthelus
(74) *Attorney, Agent, or Firm* — Christopher Parodies; Parodies Law P. A.

(57) ABSTRACT

A punch head comprises a low profile hydraulic anvil piston with a punch across from a die on opposite sides of a gap between two legs. One of the legs comprises a position sensor disposed on the bottom of the leg. For example, a plurality of punch heads are disposed on a jig or frame and are positioned using one or more of the position sensors. For example, the position sensor is a mini fiber optic position sensor mounted in a recessed portion at the bottom of one or more of the punch heads.

20 Claims, 7 Drawing Sheets

(51) Int. Cl.
   *G01D 5/26* (2006.01)
   *G02B 6/42* (2006.01)
   *H01M 10/06* (2006.01)
   *H01M 50/10* (2021.01)
   *H01M 50/529* (2021.01)

(52) U.S. Cl.
   CPC ........... *H01M 10/06* (2013.01); *H01M 50/10* (2021.01); *H01M 50/529* (2021.01)

(58) Field of Classification Search
   CPC ....... G01D 5/268; G02B 6/4202; H01M 2/02; H01M 2/24; H01M 10/06
   USPC ........................ 72/55, 333; 83/164, 100, 370
   See application file for complete search history.

(56) References Cited

U.S. PATENT DOCUMENTS

| | | | | |
|---|---|---|---|---|
| 4,468,741 | A * | 8/1984 | Simonton | G05B 19/41815 700/181 |
| 4,821,614 | A * | 4/1989 | Fleet | B21D 28/002 101/19 |
| 2011/0283879 | A1 * | 11/2011 | Schwindaman | F15B 15/1428 92/164 |
| 2015/0146218 | A1 * | 5/2015 | Kerscher | G01B 11/028 356/625 |
| 2015/0362398 | A1 * | 12/2015 | Bartho | B23Q 11/0046 73/40.5 R |

* cited by examiner

LEAD ACID BATTERY CASE PUNCH AND SENSOR

CROSS RELATED APPLICATIONS

This application is a 371 U.S. national phase application of PCT/US2019/012400 filed Jan. 4, 2019 which claims priority to U.S. Provisional Appl. 62/613,955, filed Jan. 5, 2018, the entirety of which is hereby incorporated by reference herein.

FIELD OF THE INVENTION

The field relates to lead-acid battery case manufacturing.

BACKGROUND

Piercing punch dies are known, such as the punch die disclosed in U.S. Pat. No. 3,380,160. Existing punch dies are bulky and are configured to fit a specific battery configuration. Also, positioning of existing punch dies for battery casings slows the manufacturing process.

SUMMARY

A punch head comprises a low profile hydraulic anvil piston with a punch across from a die on opposite sides of a gap between two legs. One of the legs comprises a position sensor disposed on the bottom of the leg. For example, a plurality of punch heads are disposed on a jig or frame and are positioned using one or more of the position sensors. For example, the position sensor is a mini fiber optic position sensor mounted in a recessed portion at the bottom of one or more of the punch heads.

A punch head comprises a hydraulic anvil piston in first leg of a punch body and a punch die mounted within the face of a second leg of the punch body, opposite of the first leg. The second leg provides a hole that allows material punched from the battery casing to drop through the hole. The hydraulic anvil piston comprises a punch matingly sized and shaped to fit into a hole extending entirely through the punch die mounted within the face of the second leg. The punch may be smaller than the anvil of the hydraulic anvil piston and is extendable from a surface of the first leg across a gap and into the hole of the punch die. A first seal may be disposed between the punch and the hydraulic anvil piston. In one example the punch and the hydraulic anvil piston are integrally formed from as a solid, rigid body from a single piece of material, and the first seal is seated in a groove in a neck of the material disposed between the punch and the hydraulic anvil piston. For example, a second seal is disposed in a groove formed circumferentially around an outer diameter of the hydraulic anvil piston. For example, the second seal may comprise an O-ring. The O-ring may be combined with a "T" combination seal. For example, the hydraulic anvil piston may be one inch in diameter, while the piston is one-quarter inch in diameter.

The hydraulic anvil piston is disposed in relation to a first hydraulic channel 216 and a second hydraulic channel 218 such that hydraulic fluid may be alternately applying pressure to a first side of the hydraulic anvil piston, moving the punch from an initial position in a direction toward the punch die, and applying pressure to a second side of the hydraulic anvil, opposite from the first side of the hydraulic anvil, such that the punch moves away from the punch die, i.e. returning the piston toward initial position.

In one example, a hole is bored into the second leg extending from a first surface and in fluid communication with the hole in the punch die such that material punched by operation of the punch and punch die may be vacuumed from the punch body using a vacuum tube. For example, the vacuum tube may be a thin walled vacuum tube. The think walled vacuum tube may be made of a stainless steel, for example. Punch die fasteners may provide a low profile attachment of a punch die, such as a plate, to an opposite side of the second leg, for example.

In one example, a retaining plate may be coupled with the first leg using low profile head screws such that the anvil piston is retained within the first leg.

A fiber optic sensor may be provided for positioning the punch head vertically at a specific distance from a surface opposite of the fiber optic sensor. For example, the sensor may be disposed on a bottom surface of the punch. The fiber optic sensor may be coupled with a fiber optic fiber or fibers passed through a channel through the body of the punch head. In one example, a tube may, such as a polymer tube, may be coupled with the channel such that the fiber passes through the tube. For example, the tube may be a polyethylene tube.

In one example, a plurality of punch heads are coupled by a jig or frame, and a plurality of holes may be punched in a battery casing at the same time, for example.

BRIEF DESCRIPTION OF THE DRAWINGS

The following drawings are illustrative examples and do not further limit any claims that may eventually issue.

When the same reference characters are used, these labels refer to similar parts in the examples illustrated in the drawings.

DETAILED DESCRIPTION

Figure 1:
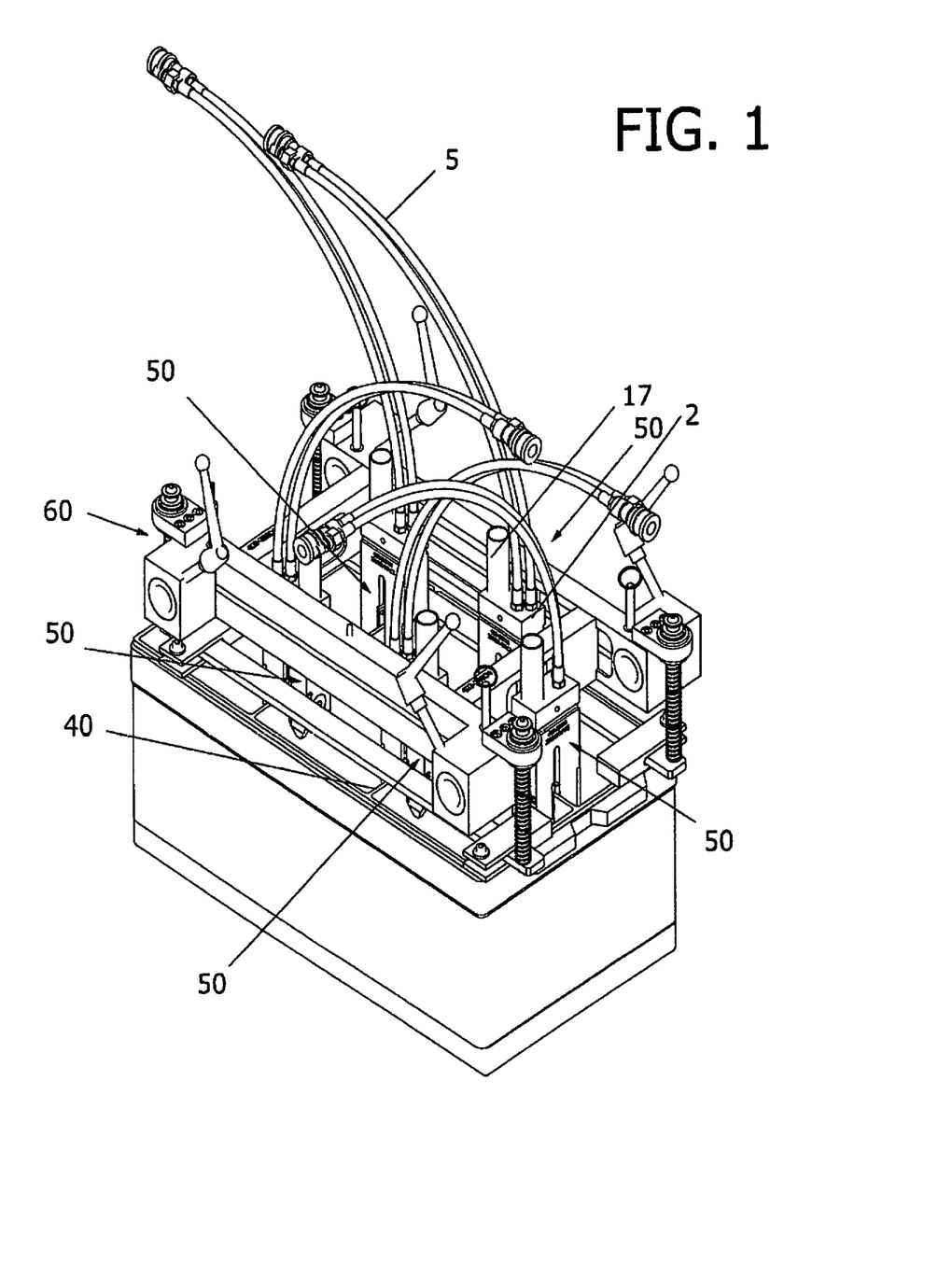
FIG. 1 illustrates an example of a plurality of punch heads coupled together by a jig or frame in relation to a battery case.

FIG. 1 illustrates an example of a plurality of punch heads 50 assembled together and coupled by a jig or frame 60. A portion of a battery case 40 may be seen with dividers disposed between opposite legs of each of the five punch heads 50. A position sensor 13 may be utilized on one or more of the punch heads 50 for positioning the punch heads 50 in relation to the battery case 40, for example. In addition, the compact form factor and material extraction through vacuum tubes 3 provide for continuous, rapid operation of the plurality of punch heads 50 at an unexpected and surprising speed and reliability, removing a bottleneck previously unaddressed by industry.

Figure 2:
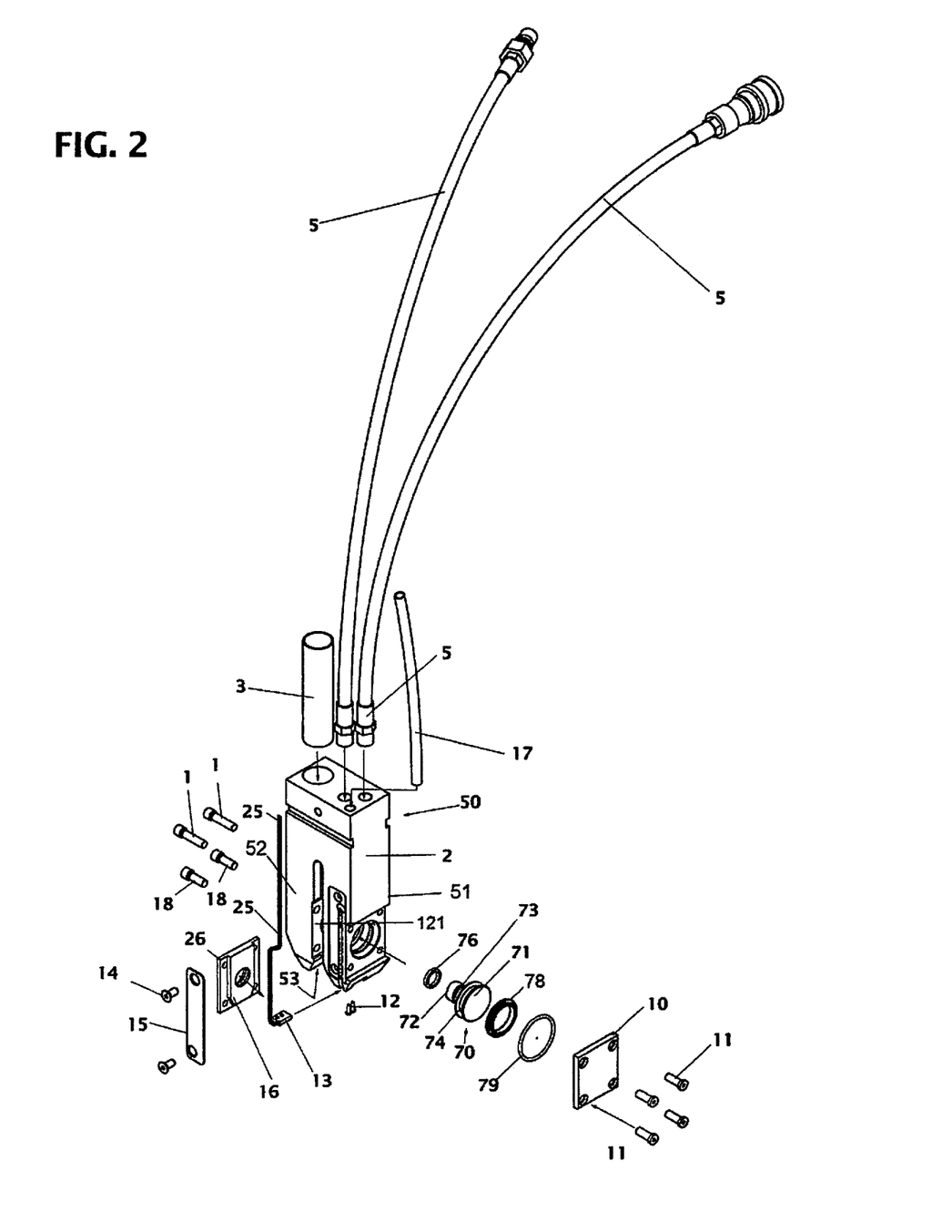
FIG. 2 illustrates an example of an exploded view of a punch head.

FIG. 2 illustrates a more detailed example in an exploded view of a punch head 50. Die fasteners 1, 18 may have different lengths. The lengths are selected such that the fasteners 1,18 maintain a low profile and couple the punch die 16 to the second leg 52 of the punch head 50, without having the ends of the fasteners extending into the gap 53, for example. The punch head body 2 has two legs, a first leg 51 and a second leg 52, for example. The legs are not identical. The first leg 51 is arranged to accommodate an anvil piston 70, which may be hydraulically actuated via hydraulic lines 5 via channels 216, 218 through the punch head body 2, as illustrated in more detail by the hidden lines in FIGS. 3 and 4A-4D, for example.

In one example, a punch head 50 comprises a punch head body 2 providing channels 216, 218 between hydraulic lines 5 and a hydraulic anvil piston 70 in a first leg 51 of the punch body 2. A punch die 16 is best shown in the exploded view of FIG. 2. The punch die 16 may be mounted within a recess of a face of a second leg 52. For example, the punch die 16 may be mounted within a recess 121 of the second leg 52 facing the gap 53 between the first leg 51 and the second leg 52. Thus, the punch die 16 is disposed opposite of the gap 53 from the portion of the anvil piston 70. The portion of the anvil piston 70 opposite from the punch die 16 is referred to herein as a punch 72. The die 16, when mounted on the second leg 52 provides a hole 26 that allows material punched from a wall of the battery casing 40 to be extracted from the punch head body 2. In one example, the punched material may fall through the hole due to gravity. Alternatively, a vacuum tube 3 may be utilized to vacuum the material via a channel extending upward to a vacuum line, such as by connecting the vacuum to thin walled vacuum tube flush mounted in a recessed portion of the channel. In one example, the hydraulic anvil piston 70 comprises the punch 72 matingly sized and shaped to fit into a hole 26 extending entirely through the punch die 16, which is mounted within the face of the second leg 52. The punch 72 is shown as being smaller than the anvil 71 of the hydraulic anvil piston 70. The punch 72 is extendable from a surface of the first leg 51 facing the gap 53. As hydraulic pressure acts on the anvil 71, the punch 72 extends across the gap 53 and punches any material between the punch 72 and the die 16 into the hole 26. As the die 16 extends through the hole 26, the punched material is pushed out of the die 16.

According to the example in FIG. 2, the hydraulic punch anvil assembly 70 comprises a punch 72 integrally formed with the anvil 71 by a neck 73. A first seal 78 may be disposed within a recess 4 disposed circumferentially about the anvil 71 portion of the hydraulic punch anvil assembly 70. A second seal 76 may be disposed within the recess formed by the neck 73, for example. The neck 73 is disposed between the punch 72 and the first seal 78 disposed in the recess 74 formed in the anvil 71. One of the hydraulic lines 5 couples to a port fluidically communicating with the volume between the first seal 78 and the second seal 76, when the punch is extended into the hole 26 of the die 16. The other one of the hydraulic lines 5 couples to a port fluidically communicating with a volume between the anvil 71 and a retainer plate 10 that is sealed by an O-ring 79 fitted in a groove formed in the first leg such that the O-ring is compressed between the first leg 51 and the retainer 10, for example. For example, the retainer utilizes a plurality of fasteners 11, such as low profile head screws, for example. In one example the punch 72 and the anvil 71 are integrally formed from a solid, rigid body. Herein, integrally formed means that a body is formed from a single piece of material, such as by deformation processing, sintering, machining, casting, or other forming processes and combinations thereof. In any of the seals, an O-ring may be combined with a "T" combination seal or other types of seals.

For example, the hydraulic punch anvil piston 70 may be comprised of a one inch diameter anvil and a one-quarter inch diameter piston. The hydraulic anvil piston 70 is disposed in relation to a first hydraulic channel and a second hydraulic channel such that hydraulic fluid may be alternately applying pressure to a first side of the hydraulic anvil piston 70, moving the punch from an initial position in a direction toward the punch die, and applying pressure to a second side of the hydraulic anvil, opposite from the first side of the hydraulic anvil, such that the punch moves away from the punch die, i.e. returning the piston toward initial position. The punch is smaller than the anvil piston and is capable of extending from the gap surface of the first leg across the gap and into the hole of the die mounted on the gap surface of the second leg, whereby a mechanical advantage is provided, increasing the pressure of the punch on the battery case during punching of a hole in the battery case.

In one example, a hole is bored into the second leg extending from a first surface in contact with the die 16 and in fluid communication with the hole 26 such that material punched from the case 40 by operation of the punch 72 and die 16 may be vacuumed from the punch body 2 using a vacuum tube. 3 mounted in a recessed portion of the channel. For example, the vacuum tube 3 may be a thin walled vacuum tube. The thin walled vacuum tube may be made of a stainless steel, for example.

Figure 3:
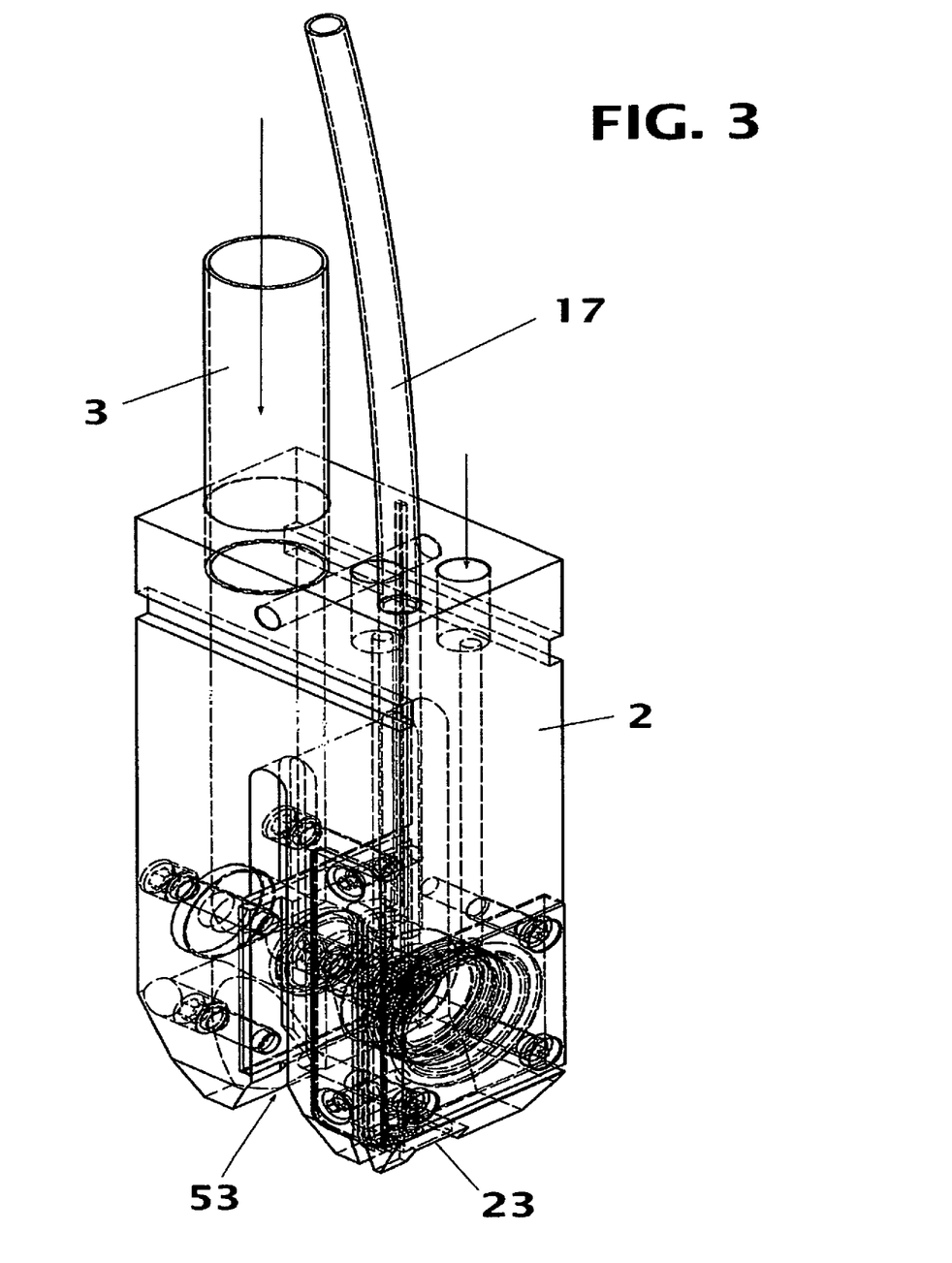
FIG. 3 illustrates an assembled punch head of FIG. 2 with hidden lines revealing the locations of the channels, die, retainer and tubes, except without hydraulic lines attached.
Figure 4A:
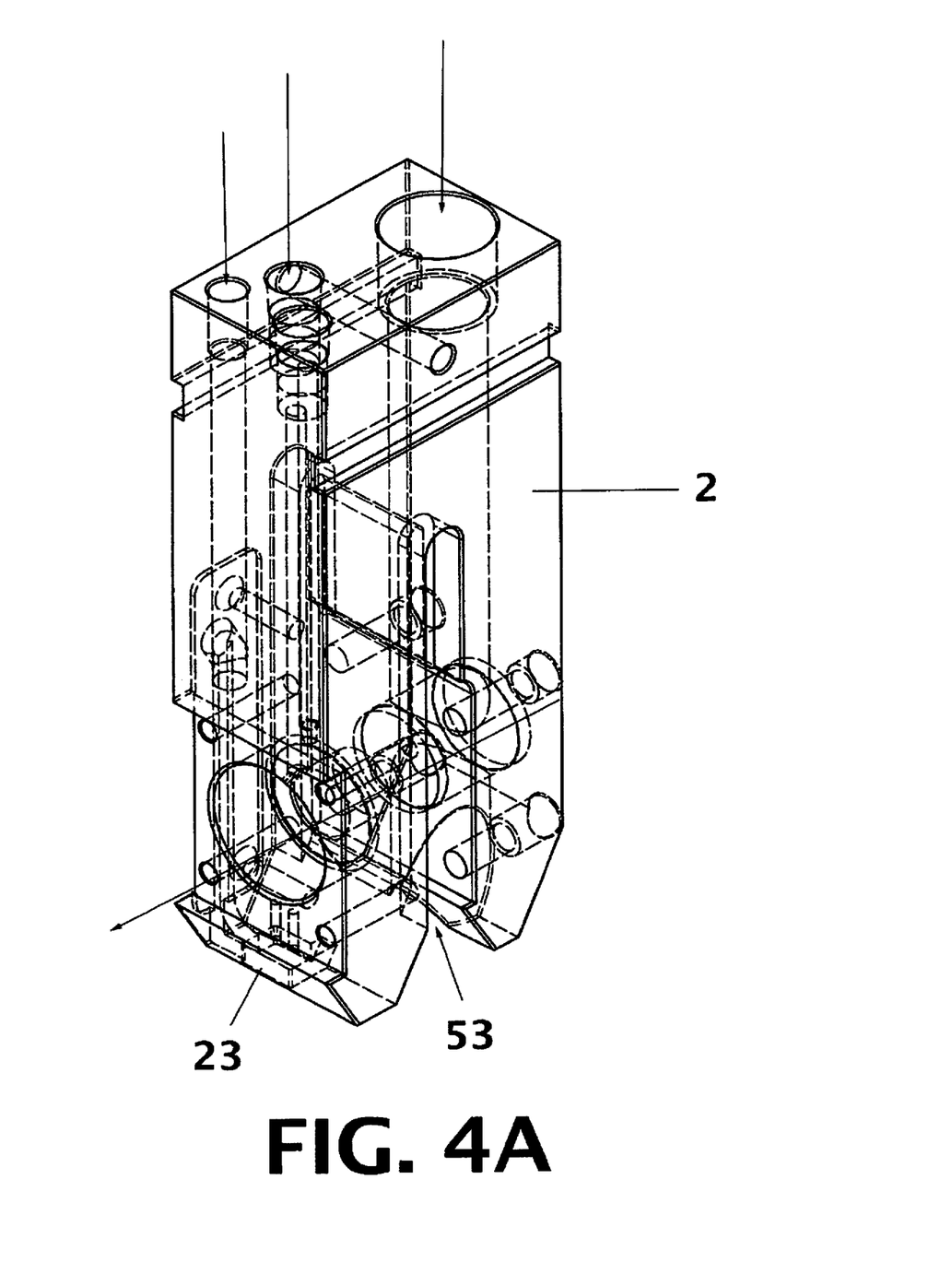
FIGS. 4A-D illustrate an example of a punch head body, alone, with hidden lines visible to show the locations of channels and fasteners, showing (A) a first leg, back perspective view, (B) a front view, (C) a first leg side view, and (D) a first leg, front perspective view.
Figure 4B:
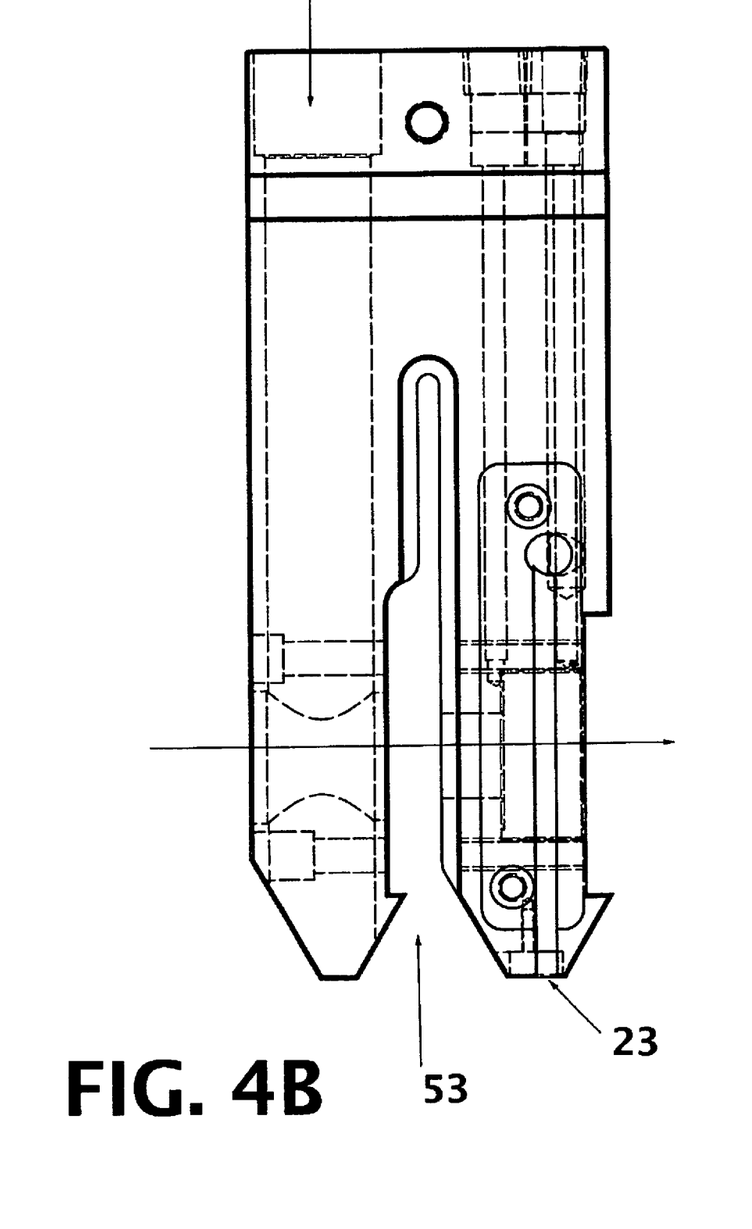
Figure 4C:
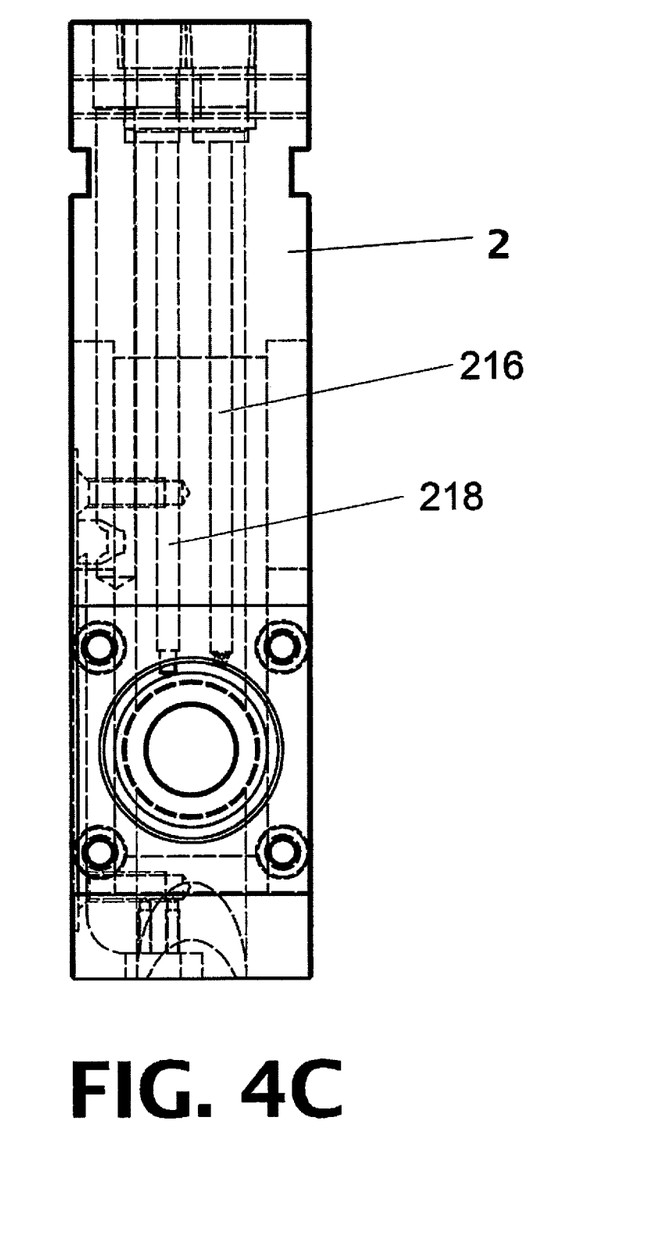
Figure 4D:
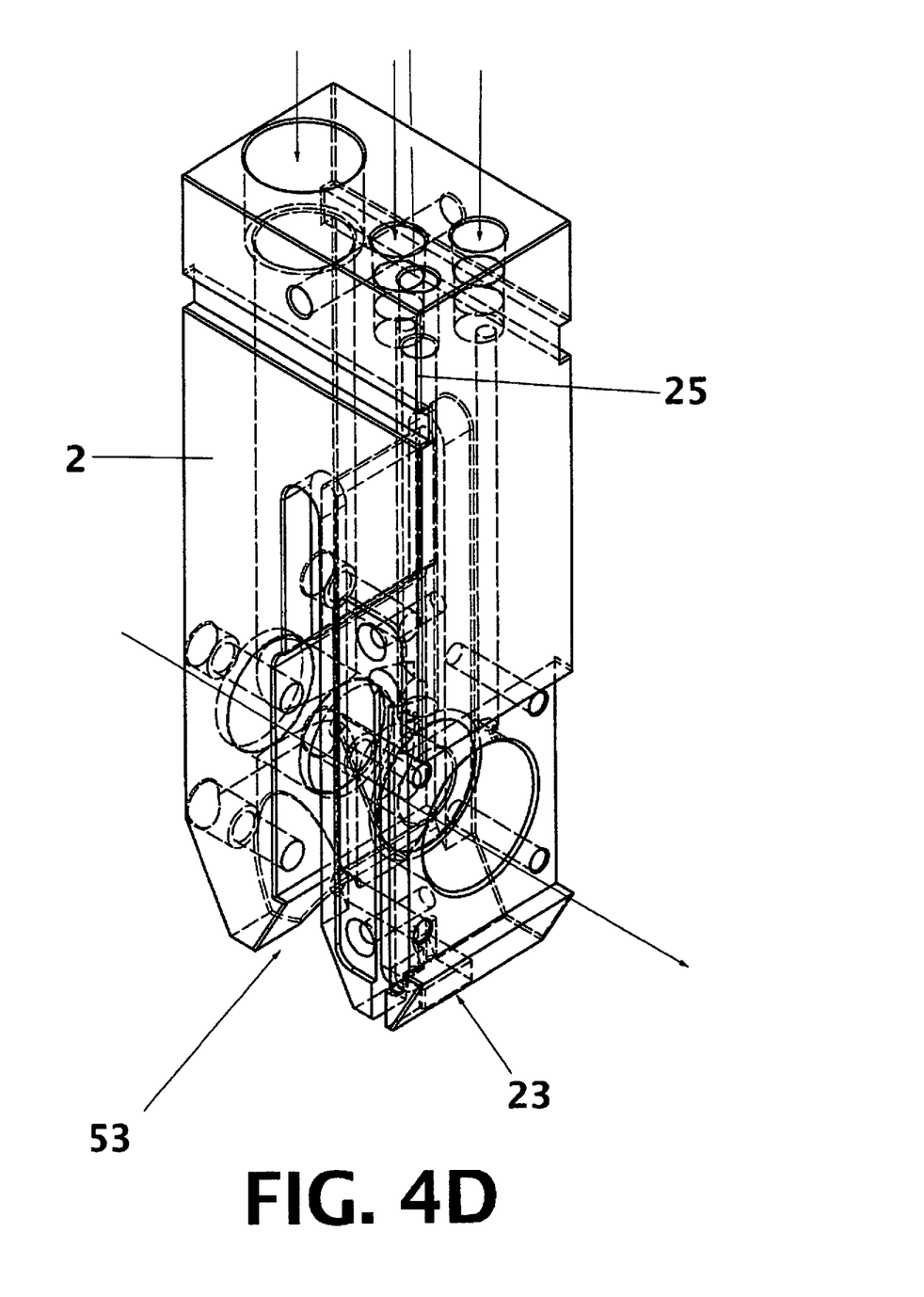

Fasteners 1,11,12,14,18 may be low profile fasteners or button head socket screws, for example. A fiber optic sensor 13, such as a mini fiber optic position sensor, may be provided for positioning the punch head at a specific distance from a surface opposite of the fiber optic sensor 13. For example, the sensor 13 may be disposed on a bottom surface of the punch, such as in the recessed portion 23 formed in the body 2, as best shown in FIG. 3. A fiber optic sensor 13 may be coupled by optical fiber or fibers, which pass through a fiber channel 24 in the body 2 of the punch head 50. In one example, a tube 17, such as a polymer tube, may be coupled with the channel such that the fiber passes through the tube. For example, the tube 17 may be a polyethylene tube. A cover 15 may be attached by fasteners 14 to the body 2 to cover the optical fiber 25 and two button head socket cap screws 12 may be used to fix the sensor 13 within the recess 23, for example. FIGS. 4A-D show four different perspective views, using hidden lines, of the channels defined within the solid body 2 of the punch head 50.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. A punch head for punching a hole in a battery case, the punch head comprises:
   an anvil piston;
   a first leg comprising a punch coupled to the anvil piston such that the anvil piston activates the punch;
   a second leg comprising a die, wherein the punch opposes the die across a gap between the first leg and the second leg, an upper portion of the first leg being coupled to an upper portion of the second leg by a bridge, the bridge, the first leg and the second leg leaving the gap open for extending the first leg and the second leg on opposite sides of the battery case, wherein the first leg, the second leg and the bridge comprise an integrally formed punch head body; and the first leg or the second leg comprises a position sensor disposed on a bottom surface of the first leg or the second leg, the bottom surface being disposed opposite of the upper portion and the bridge, wherein the position sensor is sensing a position of the leg in relation to the battery case.

2. The punch head of claim 1, wherein the anvil piston and the punch are integrally formed as a solid, rigid body from a single piece of material.

3. The punch head of claim 2, wherein the anvil piston is disposed in the first leg and is hydraulically actuated via channels extending through the first leg.

4. The punch head of claim 1, wherein the position sensor is a mini fiber optic position sensor mounted in a recessed portion of the bottom surface of the first leg or the second leg.

5. The punch head of claim 4, wherein a fiber optic fiber or fibers are coupled to the mini fiber optic position sensor and extend upwardly through the first leg.

6. The punch head of claim 1, wherein the die of the second leg comprises a hole disposed in a portion of the die such that material punched from the battery casing exits the die and the second leg through the hole disposed in the portion of the die.

7. The punch head of claim 6, wherein the punch is matingly sized and shaped to fit into the hole of the die such that the punch extends entirely through the die.

8. The punch head of claim 7, wherein the die is mounted within a recess of the second leg facing the gap between the first leg and the second leg and is disposed opposite of the punch and anvil piston that are disposed in the first leg.

9. The punch head of claim 8, wherein the punch is smaller than the anvil piston and is capable of extending from the first leg across the gap and into the hole of the die, whereby a mechanical advantage is provided increasing the pressure of the punch on the battery case during punching of a hole in the battery case.

10. The punch head of claim 8, wherein the second leg comprises a vacuum tube in fluid communication with the hole in the die.

11. The punch head of claim 10, wherein the vacuum tube extends upwardly in fluid communication with the hole in the die such that material punched by operation of the punch and die is vacuumed using the vacuum tube through the second leg.

12. The punch head of claim 11, wherein the vacuum tube is matingly sized such that the material from the battery case punched by the punch enters the vacuum tube and passes through the vacuum tube.

13. The punch head of claim 1, wherein the first leg comprises a first seal disposed between the punch and the anvil piston.

14. The punch head of claim 13, wherein the first seal is seated in a groove in a neck of the material disposed between the punch and the anvil piston.

15. The punch head of claim 14, wherein the first leg comprises a second seal, and the second seal is disposed in a groove formed circumferentially around an outer diameter of the anvil piston.

16. The punch head of claim 15, wherein the second seal comprises an O-ring.

17. The punch head of claim 16, wherein the second seal further comprises a "T" combination seal.

18. The punch head of claim 17, wherein the anvil piston is disposed in relation to a first hydraulic channel and a second hydraulic channel such that hydraulic fluid alternately applies pressure to a first side of the anvil piston, opposite of the gap, moving the punch in a first direction from an initial position toward the die, when activated, and applying a pressure to a second side of the anvil piston in an opposite direction, opposite from the first side of the anvil piston, such that the punch moves away from the die, whereby the punch is capable of being moved hydraulically by the anvil piston in both the first direction and the second direction.

19. A plurality of punch heads for punching holes in a battery case, the plurality of punch heads comprising:
a frame coupling each of the plurality of punch heads one to the other, wherein each of the plurality of punch heads comprises:
an anvil piston;
a first leg comprising a punch coupled pneumatically or hydraulically to the anvil piston such that the anvil piston activates the punch;
a second leg comprising a die, wherein the punch opposes the die across a gap between the first leg and the second leg, the first leg being coupled to the second leg by a bridge leaving the gap open for extending the first leg and the second leg on opposite sides of the battery case, wherein the first leg, the second leg and the bridge comprise an integrally formed punch head body, wherein the bridge is the top of the punch head, the first leg is a first side of the punch head and has an end facing opposite of the bridge of the punch head, the second leg is a second side of the punch head and has an end facing opposite of the bridge of the punch head; and
the end of the first leg or the end of the second leg of at least one of the plurality of punch heads further comprises a position sensor disposed on a bottom surface of the end of the first leg or the end of the second leg facing opposite of the bridge, wherein the position sensor is sensing a position of the first leg or the second leg of the at least one of the plurality of punch heads in relation to the battery case.

20. The plurality of punch heads of claim 19, wherein the position sensor is a mini fiber optic position sensor mounted in a recessed portion of the bottom surface of the first leg or the second leg and an optical fiber extends upwardly from the mini fiber optic position sensor through the first leg or the second leg.

* * * * *